Nov. 12, 1940.   G. J. DISCHERT   2,221,308
HYDRAULIC POWER TRANSMISSION MECHANISM
Filed Oct. 18, 1937   2 Sheets-Sheet 1
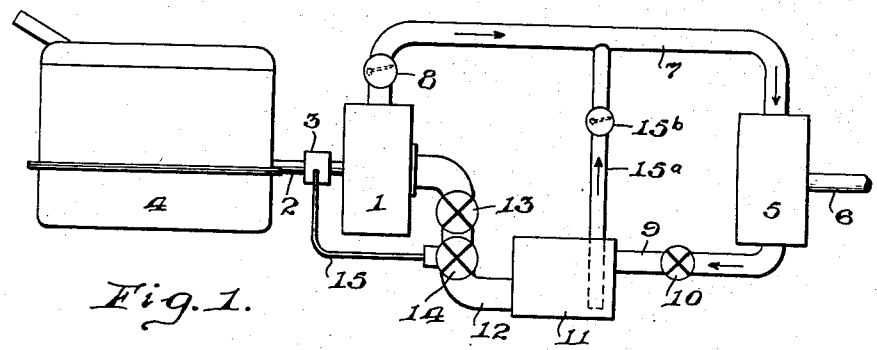
Fig. 1.
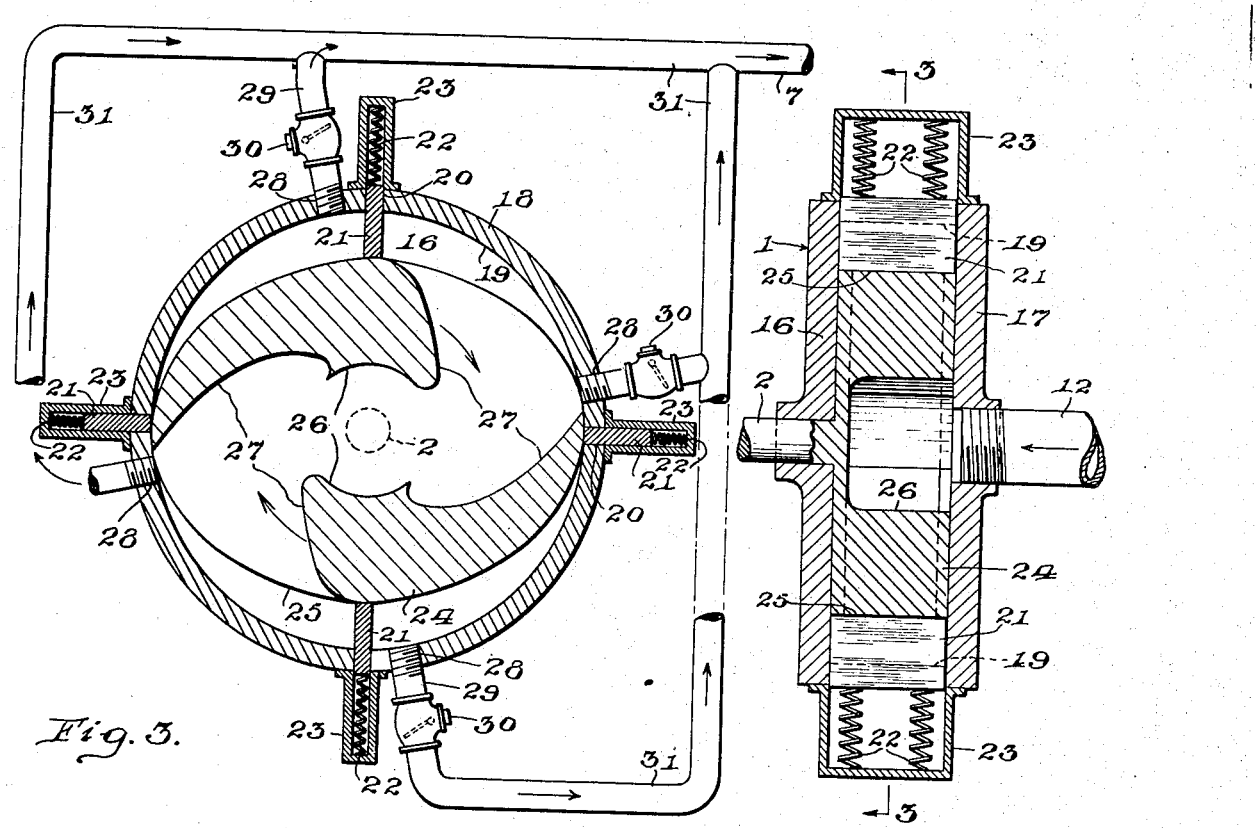
Fig. 3.
Fig. 2.
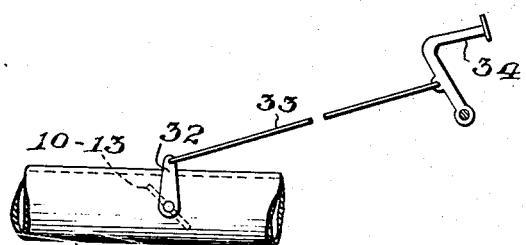
Fig. 4.
INVENTOR,
George J. Dischert,
BY
J. Stuart Freeman
ATTORNEY

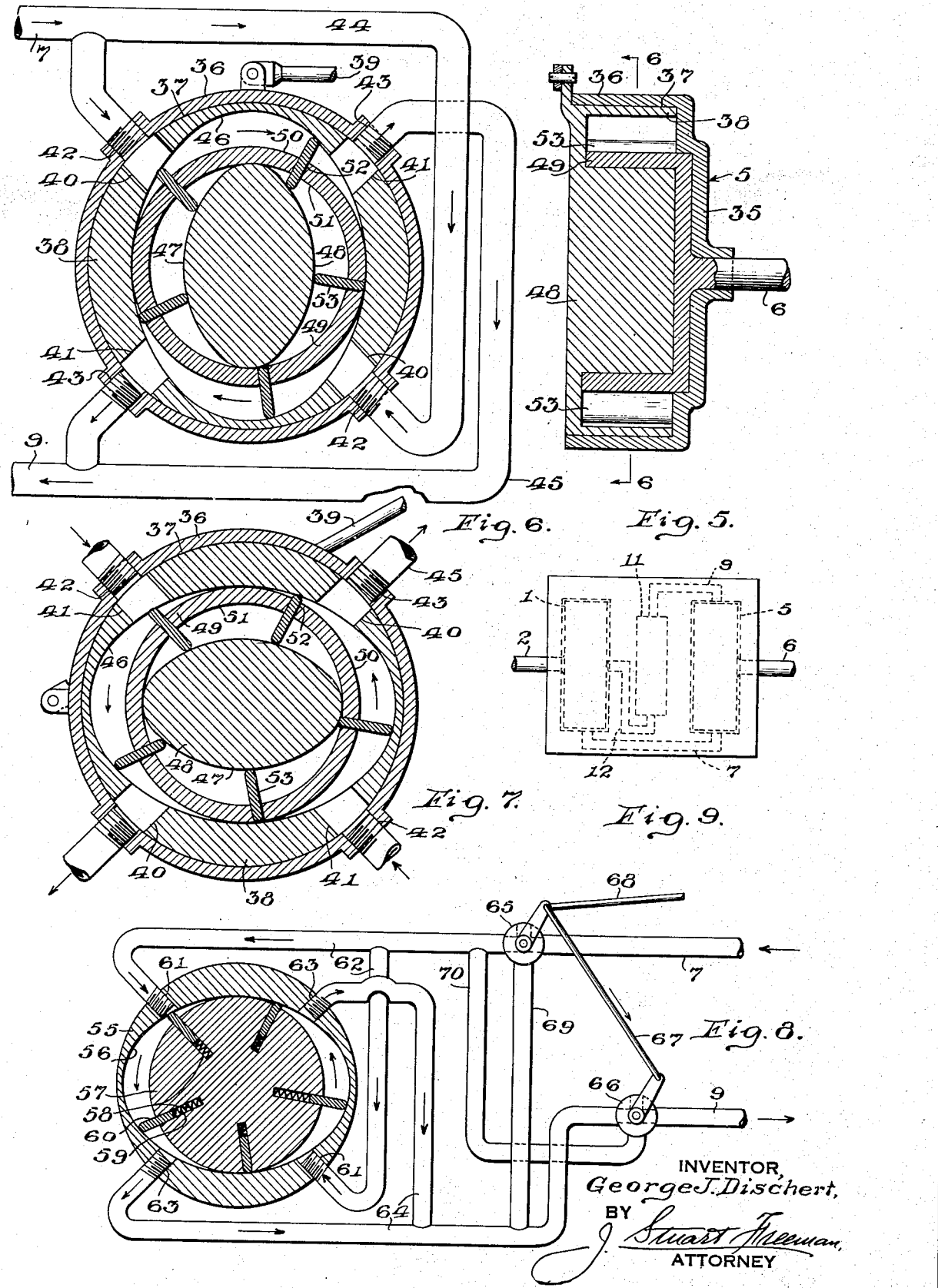

Patented Nov. 12, 1940

2,221,308

UNITED STATES PATENT OFFICE 2,221,308

HYDRAULIC POWER TRANSMISSION MECHANISM

George J. Dischert, Merchantville, N. J.

Application October 18, 1937, Serial No. 169,752

1 Claim. (Cl. 60—53)

The object of the invention is to provide improvements in power transmission mechanisms, and especially in a type which is adapted for use in the transmission of power from the usual internal combustion engine of an automobile to the driving wheels thereof.

Another object is to provide in a mechanism of this character a complete set of cooperating elements, by means of which any suitable liquid can be used as the actual power transmitting medium, due to the non-compressibility of liquids in general, while the operation of the device is controllable by means of one or more valves, instead of by levers, as in present-day types of devices employed for this purpose.

A further object is to provide a device of the utmost simplicity, as well as one that can be insured against leakage or passage of the liquid past relatively movable parts, while at the same time providing for a reversal of the resulting direction of power output, by the simple expedient of merely shifting one element of the external casing angularly through a predetermined number of degrees.

Still another object is to provide a device of this character, in which there is a closed circuit for the flow of the liquid, so that there is neither waste nor consumption of the liquid, while the actual flow of such liquid through the device is controllable by means of a governor.

And a still further object is to provide a governor-controlled device of this character, by means of which the ratio of power input to output is automatically altered, immediately upon the vehicle encountering an upgrade, and in direct proportion to the extent to which the vehicle tends to decrease its speed under the amount of effective power previously received from its engine.

And again still another object is to provide a modified form of direction controlling mechanism, whereby manually shifted valves are employed to reverse the direction of the wheel-driving motor, while the motor-driven pump unit continues to operate in the same direction.

With the objects thus briefly stated, the invention comprises further details of construction and operation, which are hereinafter fully brought out in the following description, when read in conjunction with the accompanying drawings, in which Fig. 1 is a diagrammatic view showing one embodiment of the invention and with the pump and motor indicated as separate elements, instead of being combined in one unit as would ordinarily be preferred; Fig. 2 is a diametrical section of the pump element per se; Fig. 3 is a transverse section of the same on the line 3—3 of Fig. 2, together with the external piping connecting the outlet ports together; Fig. 4 is a schematic view showing the method of operating either or both of the manually controlled valves by means of a pedal; Fig. 5 is a diametrical section through the motor per se; Fig. 6 is a transverse section on the line 6—6 of Fig. 5, and showing also the piping connecting the alternately positioned inlet and outlet ports, respectively; Fig. 7 is a section similar to Fig. 6, without said piping and showing the parts in "reverse" position; Fig. 8 is a diagrammatic view, including a transverse section through a modified form of pump, together with piping connecting the inlet and outlet ports; and Fig. 9 is a diagrammatic view representing both the pump and motor assembled together in a single unit.

Referring to Figs. 1 to 7 of the drawings, the improved system primarily comprises a liquid pump 1, having a shaft 2, provided with a centrifugal or equivalent liquid governor 3 and extending from any suitable prime mover 4, such as the internal combustion engine of an automobile, or other vehicle. Said system also comprises a liquid motor 5, having an axial shaft 6, which is normally connected in suitable manner to the driving wheels of the vehicle, either directly or through the medium of a differential or similar well-known mechanism.

In Fig. 1 a conduit 7, preferably containing a one-way valve 8, extends from said pump to said motor. A second conduit 9, containing a normally open, manually operable brake valve 10, connects said motor to a tank 11, while from said tank a further conduit 12 extends into said pump. Said last-mentioned conduit 12 is provided with a manually adjustable or pedal-actuated valve 13 for regulating the speed of the motor with respect to the pump at the will of the operator, while an automatic piston, diaphragm or similar valve 14, controlled by the governor 3, through a connecting tube 15, is also preferably included in said last-mentioned conduit so that the flow of liquid through the closed system may be regulated automatically in accordance with the speed of the engine shaft 2, so that, for instance, when the vehicle reaches an up-grade and the engine tends to have its speed decreased with the imposition of the increased load, the flow of liquid through the system will be automatically altered so as to correspondingly alter the ratio between the pump 1 and the motor 5, in order that said engine may continue to operate at a speed commensurate with high efficiency, while the said liquid motor continues to drive the vehicle, but at reduced speed. A tank 11 is, furthermore, connected by a conduit 15a to the conduit 7, and is provided with a one-way valve 15b, for a purpose hereinafter described.

When the top of the hill or incline is reached and the additional load is removed from the motor, the governor will immediately readjust the valve 14 automatically, so as to re-establish the original ratio between said pump and said motor.

Referring particularly to Figs. 2 and 3, the pump element is here shown as comprising a casing formed of oppositely positioned parallel side walls 16 and 17, through the first of which rotatably extends the engine shaft 2, while through the latter extends one end of the conduit 12, said walls being connected together at their peripheries by means of a circular wall 18, having a circular and preferably cylindrical inner surface 19. This last-named wall is provided at circumferentially spaced regions with a plurality of apertures 20, through which slidably extend radially positioned vanes 21, against the outermost surface of each of said vanes one or more springs 22 press inwardly, said springs being protected by and within suitable external housings 23. The inner end of the shaft 2 is provided with a rotatable head 24, having an external oval and preferably elliptical surface 25, against which the innermost surfaces of the vanes 21 continuously press under the force exerted by the springs 22. The actual central portion of said head is made hollow at 26, and receives liquid from the conduit 12, while from said hollow region radially outwardly expanding ducts 27 extend so as to discharge liquid received from the conduit 12 into the diametrically opposite spaces between the outer circular wall surface 19 and the inwardly positioned oval surface 25 of said head. From these last-mentioned spaces the liquid passes through ports 28 into branch conduits 29 provided with one-way valves 30, which are connected together by conduits 31, which in turn connect with the conduit 7.

In Fig. 4 there is represented either the conduit 9 or the conduit 12, provided in each case with a valve 10 or 13, respectively, and in each case said valve being provided with a lever 32, connected by a rod 33 to a pedal 34, or other form of manually actuatable means.

Referring again to Fig. 1 and considering the case in which the vehicle equipped with this device begins to roll down a hill or other incline, and as a result of which the motor 5 begins to run ahead of the pump 1, thereby forcing liquid through the by-pass conduit 15a between the conduits 9 and 7, actuation of the pedal or other means 34 to gradually close the valve 10 will accordingly serve to proportionately arrest the flow of liquid through said motor and thereby serve to reduce the speed of said motor and the vehicle wheels connected thereto, with the same result in the end as though the usual brake pressure were applied directly to the wheels of the vehicle.

Referring to Figs. 5, 6 and 7, the motor is here shown as comprising a plate 35, through which axially extends the driven shaft 6, said plate being provided peripherally with a cylindrical wall 36 having a cylindrical inner surface 37 within and in slidable contact with which surface is an angularly oscillatable member 38, the position of which may be controlled at will by means of a manually actuatable reversing means 39, so as to bring inlet ports 40 and outlet ports 41 of said member 38 into registry with the inlet ports 42 and outlet ports 43 of said cylindrical wall 36, respectively, or vice versa, as determined by the position of said member with respect to said wall, as the result of shifting the reversing means 39 into the opposite positions shown in Figs. 6 and 7. It will be noted at this point that the inlet ports of the outer wall 36 are connected together by means of a conduit 44, in turn connected to the conduit 7, while the outlet ports 43 of said wall are connected together by means of a conduit 45, which in turn is connected to the conduit 9.

The central portion of the member 38 is provided with an oval recess spaced between an inwardly directed oval and preferably elliptical surface 46 of said member and a similarly shaped outer surface 47 of an axially positioned extension 48, forming an integral portion of said member. Extending rotatably into this oval recess and forming an integral enlargement of the shaft 6 is a cylindrical flange 49, the outer surface 50 of which is substantially equal to the minimum diameter of the surrounding oval surface 46, while the diameter of its internal surface 51 is substantially equal to the maximum diameter of the oval surface 47 of the extension 48. Furthermore, this cylindrical flange 49 is provided at spaced regions with longitudinally extending slots 52, in which are positioned vanes 53, the respective outer and inner surfaces of which continuously engage the spaced oval surfaces 46 and 47, as clearly shown in Figs. 6 and 7.

The operation of the pump, as shown in Figs. 2 and 3, it will readily be seen is such as to compress liquid within each of the four circumferentially tapering cavities adjacent to the outlet ports 28, through which such liquid will flow into the conduit 7, whence the pressure of said liquid entering the inlet ports 42 of the motor of Figs. 5, 6 and 7 will cause the composite head 38—48 to rotate in the direction of the arrow (in Fig. 6) so as to thereby rotate the driven shaft 6 in the same direction. However, when said head is shifted angularly into the position shown in Fig. 7, the flow of liquid in the same direction will effect a rotation of said head and driven shaft in the opposite direction.

Fig. 9 merely shows the combination of both pump and motor in a single composite unit, the operation and relation between the respective elements composing such unit being the same as that hereinbefore described.

Referring to Fig. 8, a modified form of motor is here shown diagrammatically as comprising an outer casing 55 having an oval and preferably elliptical surface 56, within which is positioned a preferably cylindrical head 57 forming an integral extension of the shaft 6 and the diameter of said head in this case being the same as the minimum diameter of the wall surface 56. Said head is provided at spaced intervals with radially extending recesses 58, containing springs 59, which press outwardly vanes 60, the outer edges of which vanes continuously and uniformly engage the surrounding oval surface 56 through which extend inlet ports 61 connected together by a conduit 62 and outlet ports 63, connected together by a conduit 64. The conduit 62 is connected through a three-way valve 65 with the conduit 7, while the conduit 64 is connected through a three-way valve 66 with the conduit 9, said valves being connected together so as to always operate in unison by means of a rod 67 and said valve being connected by a second rod 75

68 to any suitable lever or pedal (not shown). The valve 65 is connected by means of a by-pass conduit 69 to the conduit 9, between the valve 66 and the conduit 64, while another conduit 70 connects the valve 66 with the conduit 7 between the valve 65 and the conduit 62. Thus, with the valves set in the respective positions shown in Fig. 8, liquid flowing through the conduit 7 in the direction of the adjacent arrow enters the spaces between the oval and cylindrical surfaces of the member 55 and the head 57, respectively, thereby rotating said head in counter-clockwise direction. However, upon shifting said valves through an angle of 90° in the direction of the arrow, liquid entering the valve 65 from the conduit 7 will by-pass through the conduit 69 and 64 so as to enter said motor in the opposite direction whence the liquid will emerge through the conduits 62 and 70 and valve 66 into the conduit 9, thereby causing the head 57 to rotate in the opposite or clockwise direction.

Having thus described my invention, what I claim as new and desire to protect by Letters Patent of the United States is:

A power transmitting system for vehicles, comprising a prime mover, a rotary liquid pump driven thereby, a shaft, a rotary liquid motor connected thereto, a liquid reservoir, a conduit connecting said pump with said motor, a check valve in said conduit to prevent reverse flow of liquid therethrough, a second conduit connecting said motor with said reservoir, a brake valve in said last-mentioned conduit, a third conduit connecting said first conduit with and below the liquid level in said reservoir, a check valve in said third conduit opening toward said first conduit, a fourth conduit connecting said pump with and below the liquid level in said reservoir, a manually actuated valve in said fourth conduit, an automatic valve also in said fourth conduit, a governor operable in synchronism with said prime mover and operatively connected to said automatic valve, to vary said last-mentioned valve in accordance with the speed of said prime mover, as affected by an increase in load upon said motor.

GEORGE J. DISCHERT.